(12) United States Patent
Saraf et al.

(10) Patent No.: US 8,272,024 B2
(45) Date of Patent: Sep. 18, 2012

(54) DISTRIBUTED RECORDING OF CONTENT

(75) Inventors: Somesh Saraf, Bangalore (IN); Rakesh Rajan, Kottayam (IN)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 12/982,935

(22) Filed: Dec. 31, 2010

(65) Prior Publication Data

US 2012/0174166 A1    Jul. 5, 2012

(51) Int. Cl.
*H04N 7/16* (2011.01)
(52) U.S. Cl. .................. 725/141; 725/133; 725/153
(58) Field of Classification Search .......... 725/89, 725/90, 93–95, 133, 141, 153
See application file for complete search history.

(56) References Cited

U.S. PATENT DOCUMENTS

| | | |
|---|---|---|
| 2003/0086023 A1 | 5/2003 | Chung et al. |
| 2007/0101185 A1 | 5/2007 | Ostrowka |
| 2008/0022331 A1 | 1/2008 | Barrett |
| 2009/0074380 A1* | 3/2009 | Boston et al. ............ 386/83 |
| 2009/0100478 A1 | 4/2009 | Craner et al. |
| 2009/0106801 A1 | 4/2009 | Horii |
| 2009/0178071 A1 | 7/2009 | Whitehead |
| 2010/0158479 A1 | 6/2010 | Craner |
| 2010/0235386 A1 | 9/2010 | Zhao et al. |
| 2010/0235868 A1 | 9/2010 | Howarter et al. |
| 2010/0235869 A1 | 9/2010 | Zhao et al. |
| 2010/0306811 A1 | 12/2010 | Adimatyam et al. |
| 2010/0312826 A1 | 12/2010 | Sarosi et al. |
| 2010/0319038 A1 | 12/2010 | Devassykutty et al. |
| 2010/0319039 A1* | 12/2010 | Ellis ........................ 725/93 |

OTHER PUBLICATIONS

Motorola, Inc., "Solutions Paper: Implementing Follow Me TV Solutions" (Jun. 2008). http://www.motorola.com/web/Business/Solutions/Industry%20Solutions/Service%20Providers/Cable%20Operators/Follow%20Me%20TV%20for%20Cable%20Operators/_Document/Staticfiles/Follow%20Me%20TV%20June%202008%20534254-001-id-b-update_1-4-10.pdf?localeId=33.
PCT Search Report & Written Opinion for PCT/US2011/067460, May 21, 2012.

* cited by examiner

*Primary Examiner* — Hunter B Lonsberry
(74) *Attorney, Agent, or Firm* — Stewart M. Wiener

(57) ABSTRACT

A method is disclosed for distributed recording of content in a client system having a home network connecting a content broker and a plurality of set-top boxes (STBs) with digital video recording capability. In a requesting STB, a command is received from a user to begin recording a content item. A query is sent from the requesting STB to the content broker to determine whether the content item is being recorded by any other STB of the plurality of STBs. A response is received from the content broker. If the response indicates that none of the plurality of STBs is then currently recording the content item, the content item is recorded in the requesting STB. If the response identifies a recording STB that is then currently recording the requested content, an internal content list is updated in the requesting STB to identify the recording STB.

12 Claims, 3 Drawing Sheets

DISTRIBUTED RECORDING OF CONTENT

BACKGROUND

A system for distributing video content is typically maintained by a service provider, which can be, for example, a television service provider (e.g., a national or local television network), a cable television service provider or multiple system operator (MSO), an Internet service provider, a satellite broadcast system service provider, or other suitable service provider.

High definition (HD) video content is becoming increasingly prevalent. In a conventional system, HD content and standard definition (SD) content can be streamed to media players/servers, such as a set-top box (STB), which may include personal video recorder (PVR) or digital video recorder (DVR) functionality.

Conventional PVR/DVR-enabled devices are able to store the streamed content, e.g., by recording the streamed content to a local disk or other persistent storage within or connected to the STB. Such PVR/DVR-enabled devices are limited by their local storage capacity; and if streamed content is HD, then the disk space requirement can be critical, as HD content requires more disk space than SD content.

PVR/DVR-enabled devices can be connected in a network, such as a multi-room DVR (MR-DVR) implementation. For example, in an illustrative MR-DVR implementation, a media server, such as a Multimedia over Coax Alliance (MoCA) enabled DVR set-top box, can deliver DVR content to other MoCA-enabled client set-top boxes in other rooms throughout a home.

If more than one PVR/DVR-enabled device wants to record the same content, then each one of those devices may create a copy of the same content in its local storage. This creates redundancy in a network, such as a MR-DVR implementation, where content can be shared between connected devices.

SUMMARY

In one embodiment of the present invention, a method is provided for distributed recording of content in a client system having a home network connecting a content broker and a plurality of set-top boxes (STBs) with digital video recording capability. In a requesting STB, a command is received from a user to begin recording a content item. A query is sent from the requesting STB to the content broker to determine whether the content item is being recorded by any other STB of the plurality of STBs. A response is received from the content broker. If the response indicates that none of the plurality of STBs is then currently recording the content item, the content item is recorded in the requesting STB. If the response identifies a recording STB that is then currently recording the requested content, an internal content list is updated in the requesting STB to identify the recording STB.

In another embodiment of the present invention, a method is provided for playback of distributed content in a client system having a home network connecting a content broker and a plurality of set-top boxes (STBs) with digital video recording capability. In a requesting STB, a command is received from a user to begin playback of a content item. A determination is made of whether the content item was remotely recorded in a recording STB. If the content item was remotely recorded in a recording STB, the recording STB is contacted through the home network to request streaming of the content item from the recording STB to the requesting STB. The content is received from the recording STB, and the received content is displayed to the user.

In a further embodiment of the present invention, a method is provided for distributed recording of content in a client system having a home network connecting a content broker and a plurality of set-top boxes (STBs) with digital video recording capability. In the content broker, a query is received from a requesting STB to determine whether a content item is being recorded by any other STB of the plurality of STBs. If none of the plurality of STBs is then currently recording the content item, a response is sent from the content broker to the requesting STB so that the content item can be recorded in the requesting STB. If a recording STB is then currently recording the requested content, a response is sent from the content broker to the requesting STB comprising a device identifier associated with the recording STB.

DETAILED DESCRIPTION

Figure 1:
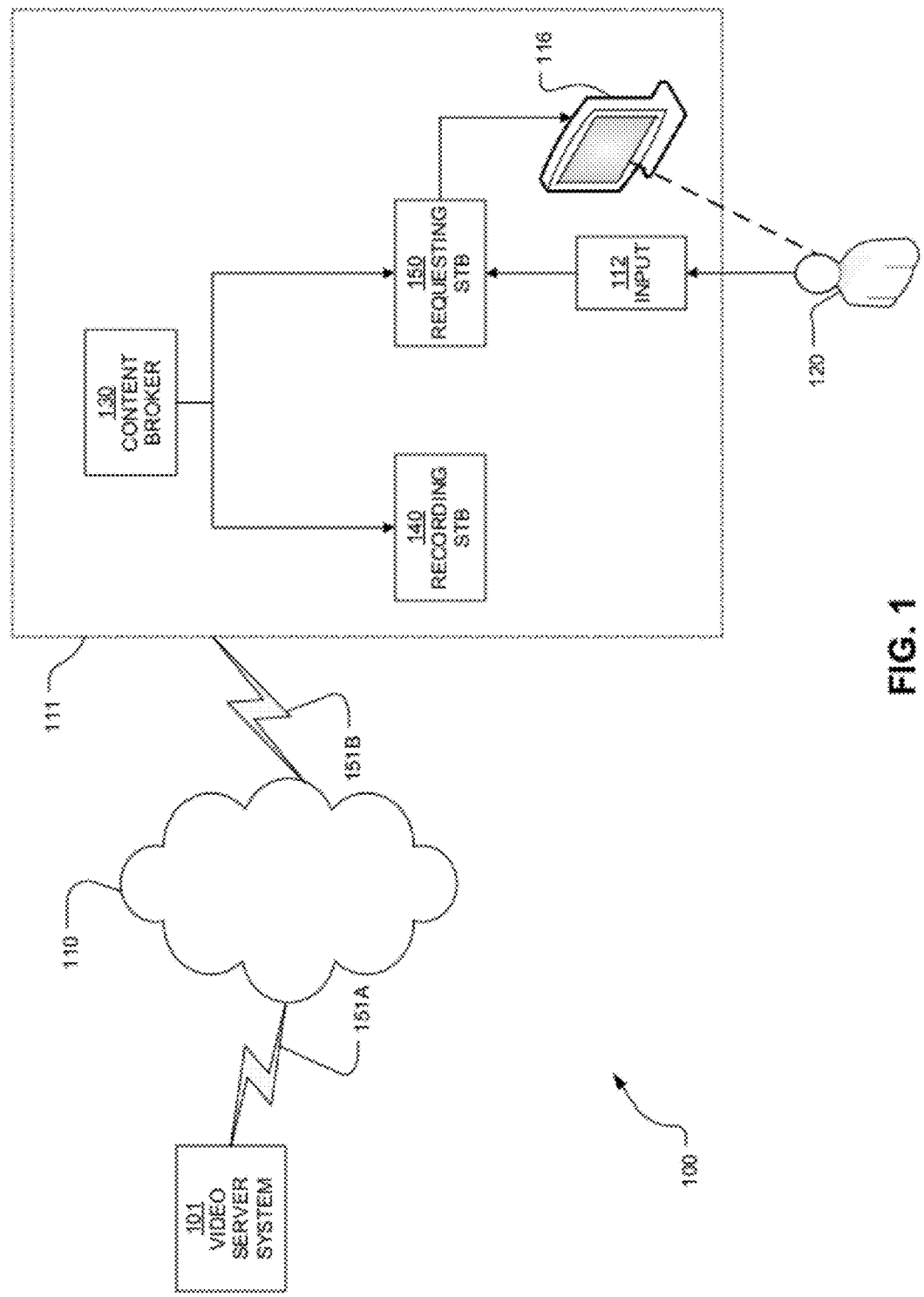
FIG. 1 is a block diagram that illustrates an exemplary content distribution system in accordance with an embodiment of the present invention.

Aspects of the present invention provide a method for distributed recording of streamed content in PVR/DVR-enabled devices, making use of the networked device architecture for efficient use of storage.

Before describing in detail embodiments that are in accordance with the present invention, it should be observed that the embodiments reside primarily in combinations of method steps and apparatus components related to a system and method for distributed recording of content. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

FIG. 1 illustrates an exemplary content distribution system 100 in accordance with an embodiment of the present invention. However, it will be understood by a person having ordinary skill in the art that aspects of the invention can be practiced using a system having other than the specific features or limitations of the illustrative content distribution system 100 described herein.

Content distribution system 100 includes a video server system 101 and at least one client system 111, the two of which are connected by an access network 110. For example, communication link 151A connects the server system 101 to the access network 110, and communication link 151B connects the client system 111 to the access network 110. Conventional content distribution systems typically include a plurality of client systems 111, not shown. The server system 101 stores, manages and delivers video content requested by a client system 111 via the access network 110. Access network 110 and communication links 151A, 151B can include, for example, a transmission medium such as an optical fiber, a coaxial cable, a hybrid fiber coaxial (HFC) network, or other suitable transmission media or wireless telecommunications.

The server system 101 typically is located in a headend (not shown) or other suitable location within the content distribution system 100. The headend typically is a regional or local hub that is part of a larger service provider distribution system, such as a cable television distribution system. The content distribution system 100 typically is based on a central server architecture. In such an architecture, the server system 101 typically is centrally located with respect to a plurality of client systems 111, and connects to each client system 111 directly via a dedicated transmission medium (in some embodiments, communication link 151B) of access network 110. In other embodiments, the content distribution system 100 can be distributed; for example, content distribution system 100 can comprise a plurality of server systems 101 located in one or more headends. In further embodiments, an exemplary server system 101 can include a plurality of servers, controllers, and/or processors, e.g., for encoding and distributing video content.

Server system 101 receives, through access network 110, requests from a client system 111. Server system 101 and client system 111 exchange information with one another through access network 110; for example, a user interface (UI) server (not shown) of server system 101 can send information for presentation to a user 120, and the client system 111 can send to the server system 101 information, commands, and the like, received in a set-top box (such as requesting STB 150) via an input device 112 from user 120. In an embodiment, each client system 111 can be associated with one or more users 120.

In an illustrative embodiment, server system 101 can receive requests for content (e.g., from client system 111), interpret the requests, pull requested content (e.g., from a database), and deliver to client system 111 a content package corresponding to the requested content. For example, the content package can be delivered via a video processor (not shown) in server system 101 that prepares and sends the data through access network 110 following proper protocols.

Client system 111 includes a content broker 130 and a plurality of set-top boxes, each connected to access network 110 and to one another by a home network, such as a network of coaxial cables. In an embodiment, at least two of the set-top boxes are PVR/DVR-enabled. For illustrative purposes, a first one of the PVR/DVR-enabled set-top boxes is designated as a requesting STB 150, and a second one of the PVR/DVR-enabled set-top boxes is designated as a recording STB 140. The designation of a requesting STB 150 and a recording STB 140 in FIG. 1 does not mean that each STB has a dedicated function; rather, any of the STBs in client system 111 can become either a requesting STB or a recording STB, if and when such functionality is required by a user 120.

The content broker 130 is a designated server in the home network that includes the plurality of set-top boxes. In an embodiment, content broker 130 can be included in one of the set-top boxes of client system 111, such as receiving STB 140 or requesting STB 150, or another STB. In a further embodiment, content broker 130 can be included in a residential gateway device, or in a separate computing device.

The content broker 130 is able to store information such as metadata related to the ongoing recording of content in the network. Examples of such metadata can include, for each item of content, a content identifier (e.g., a unique numeric value), a content name (e.g., an ASCII string representing a name for the content, such as a program name or episode title), a list of one or more device identifiers for identifying the device (e.g., an STB) in which the recorded content is stored, and for each device identifier one or more duration values (e.g., indicating the duration of recorded content stored in each device, or a beginning and ending byte offset or time offset for the recorded content).

In some embodiments, the content broker 130 can periodically broadcast some or all of the metadata related to the ongoing recording of content in the network. In other embodiments, metadata related to the ongoing recording of content in the network can be queried by a requesting STB 150 before the requesting STB 150 attempts to record the content.

For further illustrative purposes, the requesting STB 150 is shown to be connected to an input device 112, and a display 116. Examples of display 116 include a television or a monitor. For ease of illustration, only one input device 112 and one display 116 are depicted in FIG. 1; however, in a typical configuration, each of the set-top boxes in client system 111 is similarly connected to a corresponding input device 112 and display 116.

It will be understood by a person having ordinary skill in the art that the terminology "set-top" does not in any way limit the physical placement of a set-top box such as STBs 140, 150. That is, a set-top box need not be positioned on top of a television set. Each set-top box is any suitable signal processing device or system for processing video signals, such as any signal converter or decoder (set-top) box, or other suitable computing device or video device with set-top box and/or cable modem capabilities, including a residential gateway, an internet protocol (IP), satellite or cable digital video recorder, a digital video disk (DVD) recorder, a computer, or a home media server system. In further embodiments, a set-top box can be a laptop, notebook, or tablet computer, or a mobile device, or can be built into the display 116. An exemplary set-top box comprises a computing device that connects the display 116 and an external signal source, turning the signal into a content stream that the display 116 is able to render and display. For example, an exemplary set-top box can convert data signals to audio/video content and output the data to display 116, and is communicatively coupled to the display 116 via a wired or wireless connection.

A set-top box and/or content server 130 can be completely or partially configured in the form of hardware circuitry and/or other hardware components within a larger device or group of components. Alternatively, a set-top box and/or content server 130 can be completely or partially configured in the form of software, e.g., as processing instructions or one or more sets of logic or computer code. In such configuration, the logic or processing instructions typically are stored in a data storage device, which typically is coupled to a processor or controller. Both the data storage device and the processor or controller can be included as part of a set-top box, although such is not necessary. The processor or controller accesses the necessary instructions from the data storage device and executes the instructions or transfers the instructions to the appropriate location within the set-top box.

An exemplary set-top box is able to receive input commands from a corresponding input device 112 and send requests embodied in the input commands through access network 110 to server system 101. As depicted in FIG. 1, a user 120 can operate input device 112 to send commands to a requesting STB 150. For example, user 120 can use input device 112 to control a user interface (UI) application of requesting STB 150 (e.g., for navigation and selection of content items from menus). Input device 112 is communicatively coupled to the requesting STB 150 either via a wired or wireless connection. In some embodiments, input device 112 can be a remote control device. In further embodiments, input device 112 can be a computer (e.g., a desktop, laptop, notebook, or tablet computer), or a mobile device or smartphone, and/or can be completely or partially configured in the form of software running on a computer. In still further embodiments, input device 112 can be built into the requesting STB 150. In an exemplary embodiment, upon receipt of input commands, such as changing to a new channel, the UI application causes the requesting STB 150 to send corresponding instructions upstream through access network 110 to server system 101. Other set-top boxes in client system 111, such as recording STB 140, are similarly able to receive commands from a corresponding input device 112.

Figure 2:
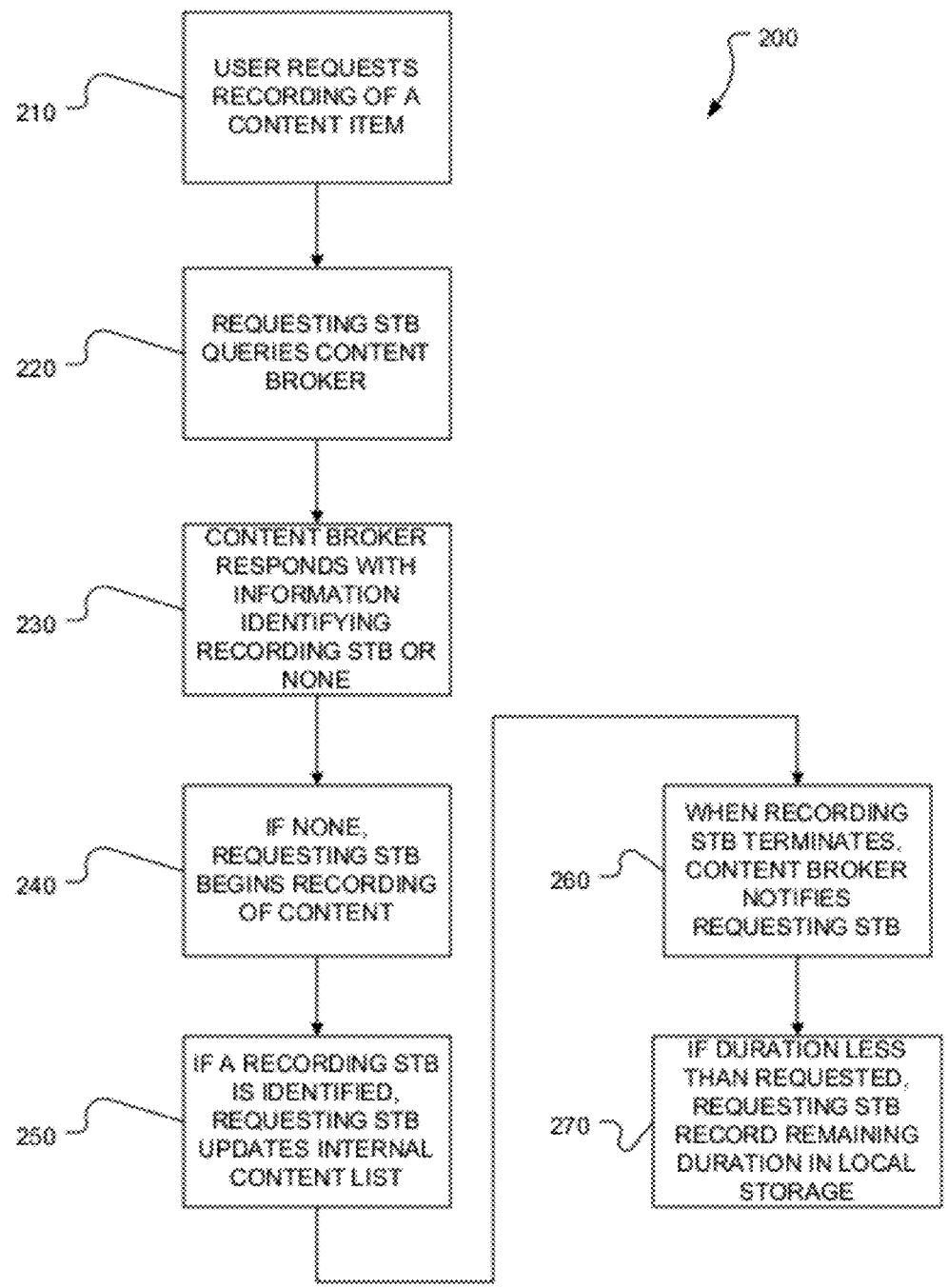
FIG. 2 is a flow diagram that illustrates a method for distributed recording of content according to an embodiment of the present invention.

FIG. 2 is a flow diagram that illustrates a method 200 for distributed recording of content according to an embodiment of the present invention.

In step 210, any PVR/DVR-enabled set-top box in client system 111 attempts to begin recording a content item. For example, user 120 of requesting STB 150 uses input device 112 to request recording of a content item (e.g., a movie or a television program) delivered from the server system 101.

In step 220, the requesting STB 150 queries the content broker 130 to determine whether the same content item is being recorded by any other STB in the client system 111. The request includes a device identifier uniquely identifying the requesting STB 150.

In step 230, the content broker 130 responds with information, such as a device identifier that identifies a set-top box that is then currently recording the requested content (i.e., recording STB 140); or, in the alternative, responds with information indicating that none of the set-top boxes in client system 111 is then currently recording the requested content.

In step 240, if the content broker 130 responds with information indicating that none of the set-top boxes in client system 111 is then currently recording the requested content, then requesting STB 150 begins recording the requested content, and notifies the content broker 130 that it is doing so.

In step 250, if the content broker 130 responds with information identifying a set-top box that is then currently recording the requested content (i.e., recording STB 140), then the requesting STB 150 does not start recording, but instead updates an internal content list to identify the remote recording. The internal content list stores the information received from content broker 130, such as the device identifier that identifies a set-top box that is then currently recording the requested content (e.g., recording STB 140).

In step 260, when recording is terminated in the recording STB 140 (either by completion, or by a termination event such as a command received from user 120), the content broker 130 notifies the requesting STB 150 of the termination.

In step 270, if the requesting STB 150 determines that the duration of the recording in the recording STB 140 is less than the requested recording duration, then the requesting STB 150 begins recording the remaining duration of the content in its local storage.

Figure 3:
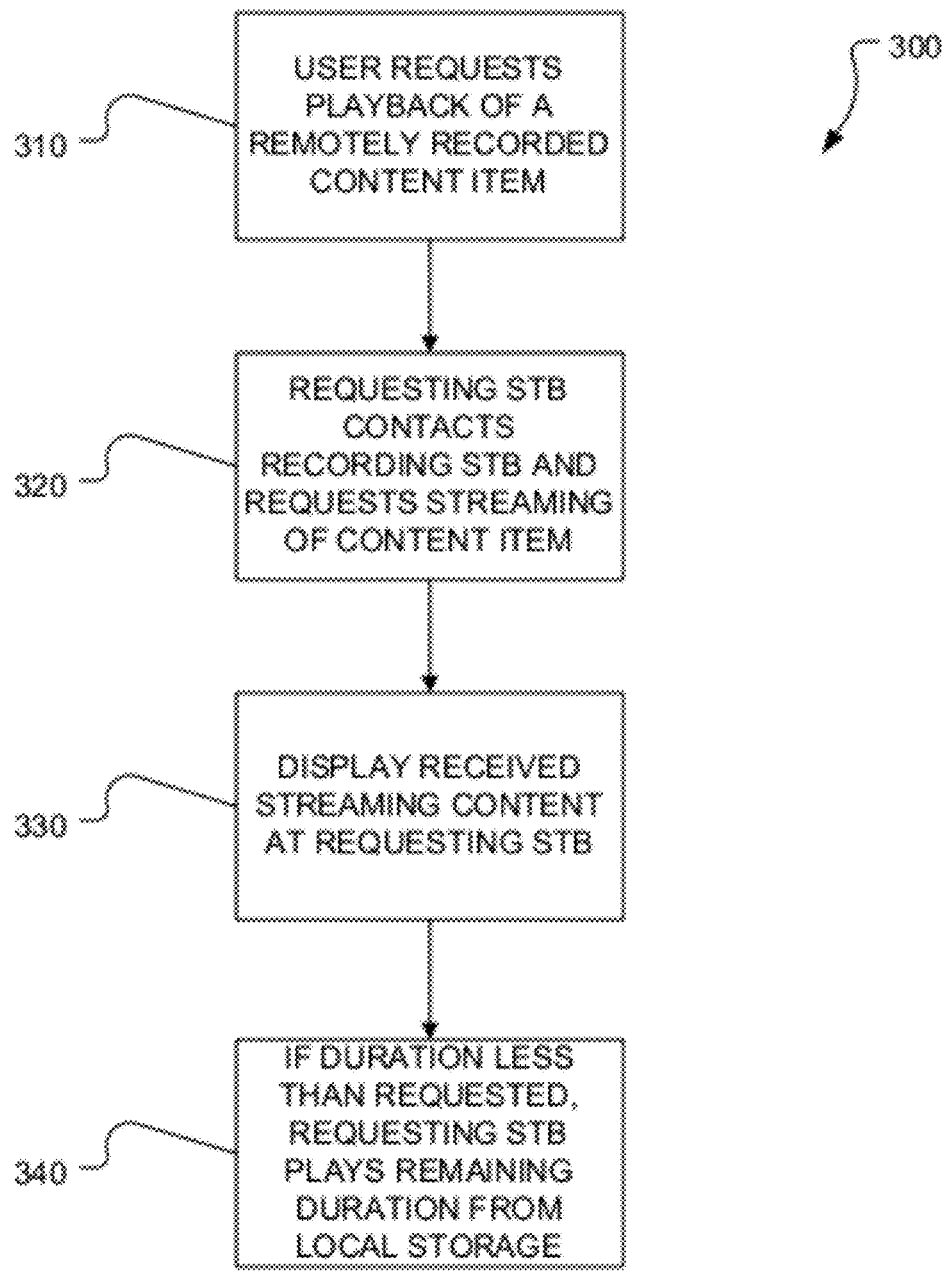
FIG. 3 is a flow diagram that illustrates a method for playback of distributed content according to a further embodiment of the present invention.

FIG. 3 is a flow diagram that illustrates a method 300 for playback of distributed content according to an embodiment of the present invention.

In step 310, any PVR/DVR-enabled set-top box in client system 111 attempts to begin playing a remotely recorded content item. For example, user 120 of requesting STB 150 uses input device 112 to request playback of a content item (e.g., a movie or a television program) which was previously requested by the requesting STB 150. It is noted that at step 250, the requesting STB 150 internally stored information received from content broker 130, such as the device identifier that identifies a set-top box that was then-currently recording the requested content (e.g., recording STB 140). Accordingly, the requesting STB 150 does not need to contact the content broker 130 to obtain this information at the time the user 120 requests playback of the content item.

In step 320, the requesting STB 150 contacts the recording STB 140 through the home network and requests streaming of the content from the recording STB 140 to the requesting STB 150.

In step 330, the streaming content from the recording STB 140 is displayed by the requesting STB 150 to the user 120 (e.g., on display 116).

In step 340, if the requesting STB 150 determines that the duration of the recording in the recording STB 140 was less than the requested recording duration, then the requesting STB 150 begins playing back the remaining duration of the content from its local storage and displays the remaining duration of the content to the user 120 (e.g., on display 116).

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for distributed recording of content in a client system having a home network connecting a content broker and a plurality of set-top boxes (STBs) with digital video recording capability, the method comprising:

in a requesting STB within the home network, receiving a command from a user to begin recording a content item that is then currently available for delivery to any one or more of the plurality of STBs from a video server system via an access network, wherein the access network is different from the home network, and wherein the access network connects the video server system to the client system;

sending a query, via the home network, from the requesting STB to the content broker within the home network, to determine whether the content item is being recorded by any other STB of the plurality of STBs within the home network;

receiving a response, via the home network, from the content broker;
if the response indicates that none of the plurality of STBs within the home network is then currently recording the content item, recording the content item in the requesting STB as the content item is delivered to the requesting STB from the video server system via the access network; and
if the response identifies a recording STB within the home network that is then currently recording the requested content item, delivered to the recording STB from the video server system via the access network, updating an internal content list in the requesting STB to identify the recording STB within the home network.

2. The method of claim 1 further comprising, when recording is terminated in the recording STB, receiving a notification of the termination from the content broker to the requesting STB.

3. The method of claim 2 further comprising, if the requesting STB determines that a duration of the recording in the recording STB is less than a requested recording duration, recording a remaining duration of the content item in a local storage of the requesting STB.

4. The method of claim 1 wherein the query includes a device identifier uniquely identifying the requesting STB.

5. The method of claim 1 wherein the response comprises a device identifier uniquely identifying the recording STB.

6. The method of claim 1 wherein updating the internal content list comprises storing information received from the content broker in the requesting STB, the information comprising a device identifier uniquely identifying the recording STB.

7. The method of claim 1, further comprising:
in the requesting STB, receiving a command from a user to begin playback of the content item;
contacting the recording STB through the home network to request streaming of the content from the recording STB to the requesting STB;
receiving the content from the recording STB; and
displaying the received content to the user.

8. The method of claim 7, further comprising:
if the requesting STB determines that a duration of the recording in the recording STB is less than a requested recording duration, displaying to the user a remaining duration of the content item from a local storage of the requesting STB.

9. A method for playback of distributed content in a client system having a home network connecting a content broker and a plurality of set-top boxes (STBs) with digital video recording capability, the method comprising:
in a requesting STB within the home network, receiving a command from a user to begin playback of a content item that was previously delivered to any one or more of the plurality of STBs from a video server system via an access network, wherein the access network is different from the home network, and the access network connects the video server system to the client system;
determining whether the content item was remotely recorded in a recording STB within the home network, wherein the recording STB and the requesting STB are two different STBs of the plurality of STBs within the home network;
if the content item was remotely recorded in the recording STB within the home network, contacting the recording STB through the home network to request streaming of the content item from the recording STB to the requesting STB via the home network;
in the requesting STB, receiving the content from the recording STB via the home network; and
in the requesting STB, displaying the received content to the user.

10. The method of claim 9, further comprising:
if the requesting STB determines that a duration of the recording in the recording STB is less than a requested recording duration, displaying to the user a remaining duration of the content item from a local storage of the requesting STB.

11. The method of claim 8 wherein determining whether the content item was remotely recorded in a recording STB comprises:
reading stored information in the requesting STB, the information having been previously received in the requesting STB from the content broker, the information comprising a device identifier uniquely identifying the recording STB.

12. A method for distributed recording of content in a client system having a home network connecting a content broker and a plurality of set-top boxes (STBs) with digital video recording capability, the method comprising:
in the content broker within the home network, receiving a query via the home network from a requesting STB within the home network to determine whether a content item is being recorded by any other STB of the plurality of STBs, wherein the content item is then currently available for delivery to any one or more of the plurality of STBs from a video server system via an access network, wherein the access network is different from the home network, and wherein the access network connects the video server system to the client system;
if none of the plurality of STBs is then currently recording the content item, sending, from the content broker to the requesting STB via the home network, a response for triggering recording of the content item in the requesting STB as the content item is delivered to the requesting STB from the video server system via the access network;
if a recording STB is then currently recording the requested content item, delivered to the recording STB from the video server system via the access network, sending a response, from the content broker to the requesting STB via the home network, the response comprising a device identifier associated with the recording STB.

* * * * *

UNITED STATES PATENT AND TRADEMARK OFFICE
CERTIFICATE OF CORRECTION

PATENT NO. : 8,272,024 B2
APPLICATION NO. : 12/982935
DATED : September 18, 2012
INVENTOR(S) : Somesh Saraf et al.

Page 1 of 1

It is certified that error appears in the above-identified patent and that said Letters Patent is hereby corrected as shown below:

In the Claims

Claim 8, Column 7, line 41, delete "claim 7" and insert --claim 3--.

Claim 8, Column 7, line 42, delete "a" and insert --the--.

Claim 8, Column 7, line 43, delete "a" and insert --the--.

Claim 8, Column 7, line 45, delete "a" and insert --the--.

Claim 11, Column 8, line 21, delete "claim 8" and insert --claim 9--.

Signed and Sealed this
Twenty-second Day of July, 2014

Michelle K. Lee
*Deputy Director of the United States Patent and Trademark Office*